United States Patent [19]

Hertig et al.

[11] Patent Number: 4,751,948
[45] Date of Patent: Jun. 21, 1988

[54] METHOD AND APPARATUS FOR THE ACCURATE DELIVERY OF POWDERS

[75] Inventors: John C. Hertig, El Toro; Trevor Dawson, Rancho Palos Verdes, both of Calif.

[73] Assignee: Kendall McGaw Laboratories, Inc., Irvine, Calif.

[21] Appl. No.: 792,791

[22] Filed: Oct. 30, 1985

[51] Int. Cl.⁴ .......................... G01F 11/24; B65B 1/16; B65B 37/14
[52] U.S. Cl. ...................................... 141/67; 222/636; 141/93
[58] Field of Search ............................ 141/1, 67, 4–8, 141/10, 105, 24.71, 249, 93, 94, 83, 129; 222/636

[56] References Cited

U.S. PATENT DOCUMENTS

| | | | |
|---|---|---|---|
| 1,416,156 | 5/1922 | Anderson et al. | 141/67 |
| 1,826,926 | 10/1931 | Cundall | 141/78 |
| 2,314,031 | 3/1943 | Colburn | 406/63 |
| 2,540,059 | 1/1951 | Stirn et al. | 141/1 |
| 3,195,586 | 7/1965 | Vogt | 141/1 |
| 3,324,902 | 6/1967 | Lense | 141/1 |
| 3,357,155 | 12/1967 | Carruthers | 53/167 |
| 3,587,671 | 6/1971 | Gamberini | 141/67 |
| 3,589,411 | 6/1971 | Vogt | 141/71 |
| 3,757,833 | 9/1973 | Dugger et al. | 141/186 |
| 4,005,668 | 2/1977 | Washington et al. | 141/67 |
| 4,177,940 | 12/1979 | McHugh | 222/636 |
| 4,177,941 | 12/1979 | Leong | 222/636 |
| 4,182,591 | 1/1980 | Stanelle | 414/291 |
| 4,347,876 | 9/1982 | Morgan | 141/70 |
| 4,483,367 | 11/1984 | Ross, Jr. et al. | 137/416 |
| 4,493,350 | 1/1985 | Beikel et al. | 141/65 |
| 4,499,931 | 2/1985 | Urban | 141/67 |
| 4,508,148 | 4/1985 | Trechsel et al. | 141/147 |
| 4,513,671 | 4/1985 | Eshleman | 141/94 X |
| 4,528,848 | 7/1985 | Hafner | 73/218 |

FOREIGN PATENT DOCUMENTS

| | | | |
|---|---|---|---|
| 1024881 | 2/1958 | Fed. Rep. of Germany | 141/67 |
| 8401348 | 4/1984 | PCT Int'l Appl. | 141/67 |

Primary Examiner—Henry J. Recla
Assistant Examiner—Ernest G. Cusick
Attorney, Agent, or Firm—John A. Kane

[57] ABSTRACT

A method for loading a predetermined amount of particulate material into a container comprising providing a hopper containing a supply of the particulate material and a movable plate at least partly below the hopper, with the plate having a series of openings extending therethrough. The particulate material in the hopper is allowed to flow into and fill at least some of the openings in the plate, and the density of the particulate material in the openings is controlled. The plate is moved to move the filled openings to a filling station, and the particulate material from the openings is transferred to a container at the filling station. A plurality of the filled openings is used to deliver particulate material to each container so that any differences in the quantity of particulate material in the filled openings tends to be averaged.

6 Claims, 5 Drawing Sheets

METHOD AND APPARATUS FOR THE ACCURATE DELIVERY OF POWDERS

BACKGROUND OF THE INVENTION

It is often necessary or desirable to deliver particulate material in accurate, measured amounts into containers. For example, a high degree of accuracy in the delivery of particulate material is required when the particulate material is a medication. The term "particulate material" as used herein is intended to include powders or granular material, regardless of the particle size. However, this invention is particularly adapted for use with finely divided particulate material, such as powders.

One way to deliver particulate material is to utilize an apparatus which includes a rotatable turret having a series of openings which can be filled with the particulate material. The turret is rotated to bring the openings to a filling station where the powder is removed from the openings. Rotating turret devices are shown, for example, in Leong U.S. Pat. No. 4,177,941, Colburn U.S. Pat. No. 2,314,031, Hafner U.S. Pat. No. 4,528,848 and Anderson et al U.S. Pat. No. 1,416,156. Unfortunately, none of these devices provides the accuracy and speed desired especially for the delivery of relatively large volumes of various particulate materials, such as medications in powder form.

One desirable technique for transferring the particulate material from the openings to the container at the filling station is with a blast of gas, such as air, under pressure. This is troublesome, however, when the container to be filled is in the form of a bag which can be inflated by the air. The prior art does not deal with this container inflation problem. In addition, equipment that handles particulate materials, particularly powders, is difficult to keep clean because of the tendency of the finely divided material to get between the movable parts of the equipment.

SUMMARY OF THE INVENTION

This invention provides a method and apparatus for the accurate and rapid delivery of relatively large volumes of particulate materials, including powders, into containers. Accordingly, this invention is particularly suited for use with particulate material which must be very accurately measured, such as medications in powdered form. In addition, this invention solves the container inflation problem referred to above and provides other novel and advantageous features.

The features of this invention are applicable to an apparatus which includes a hopper for containing a supply of the particulate material and a movable plate having a plurality of openings therethrough. The plate is positioned below the hopper so that the particulate material from the hopper can fill the openings under the influence of gravity. The plate is moved to move the filled openings to a filling station to thereby transport the particulate material in the openings to the filling station. At the filling station, the particulate material from the openings is transferred to the container. Although the plate could move linearly, preferably it is in the form of a rotatable turret.

With this invention, accuracy of the quantity of particulate material delivered is improved in several ways. For example, the volume of each of the openings in the plate is selected so as to be smaller than the volume of particulate material which is to be loaded into the container. With this construction, a plurality of the openings must have the particulate material therein discharged into the container in order to provide the correct dosage of the particulate material in the container. Consequently, any differences in the quantity of particulate material loaded into the openings tends to be averaged out. To obtain the averaging desired, it is preferred to transfer the particulate material from at least five of the openings to the container. For even better results, a greater number of the openings, such as fifteen, should have the particulate material transferred from them to a single container.

The weight of the particulate material in an opening depends, not only on the volume of the opening, but also on the density of the material in the opening. This invention provides for increased accuracy by using the static head of the particulate material in the hopper to control the density of the material in the openings and by controlling the height or static head of the particulate material in the hopper.

To help assure that a constant volume of the material will be loaded into each of the openings through the complete filling of each of the openings, it is preferred to employ openings which have an axial dimension which is no greater than about the diameter of the opening. In addition, an agitator is used to break up any clumps of the particulate material in the hopper and to further assist in completely filling each of the openings.

To help solve the container-inflation problem when an inflatable container is employed, this invention communicates the interior of the container with a source of reduced pressure to remove at least some of the air or other gas from the container. This may be accomplished following each transfer of material from an opening into the container or following each transfer of material from multiple openings into the container.

To further reduce the container-inflation problem, this invention reduces the volume of air employed in the transfer of material from the openings into the container. This can be accomplished, for example, by directing gas in a generally tubular pattern toward the opening at the filling station. The tubular pattern, which preferably is in general registry with the periphery of the opening at the filling station, provides for thorough removal of the material with a minimum volume of air. If desired, the gas may be directed into the opening in a direction which has components extending both axially and circumferentially of the opening so that at least some of the particulate material is swirled as it is transferred from the opening to the container.

In a preferred construction, the apparatus includes a member below the movable plate for closing the lower ends of the openings in the plate. This member has a discharge port at the filling station, and transfer of the particulate material from the openings to the container is carried out as each opening is brought into registry with the discharge port. Preferably, the plate is indexed to sequentially bring the openings over the discharge port, respectively.

Particulate material tends to get between this member and the movable plate. According to this invention, at least one groove is provided in the confronting surface of the member for collecting material that gets between the plate and the member. This material can be removed in various ways, including the use of vacuum pressure. In addition, the plate and member have confronting surfaces which are coated with a hard low-friction coating.

Although the height of the material in the hopper can be controlled in different ways, in a preferred construction, such controlling means includes a secondary hopper above the first-mentioned or primary hopper, valve means for controlling flow of the material from the secondary hopper to the primary hopper and means responsive to the level of the particulate material in the primary hopper dropping below a predetermined level for opening the valve means. To prevent the valve means from becoming jammed open by the particulate material, it preferably includes a valve seat having at least one aperture, a valve element having at least one aperture and means for mounting the valve element for movement radially of the aperture in the valve seat between an open position in which the apertures are partially in registry and a closed position in which the apertures are not in registry. The maximum extent to which the apertures may be placed in registry in the open position is also adjustable.

The invention, together with additional features and advantages thereof, may best be understood by reference to the following description taken in connection with the accompanying illustrative drawing.

DESCRIPTION OF THE PREFERRED EMBODIMENT

Figure 1:
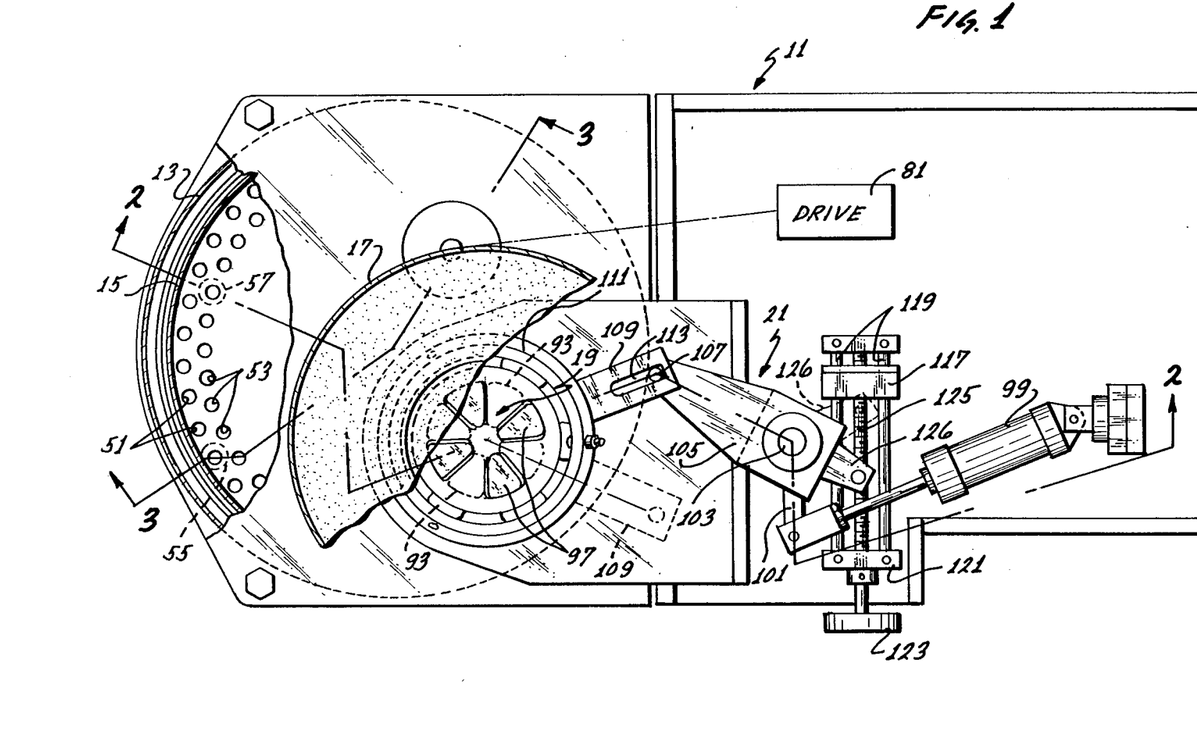
FIG. 1 is a top plan view, with the upper or secondary hopper portions broken away, of one form of apparatus constructed in accordance with the teachings of this invention.
Figure 2:
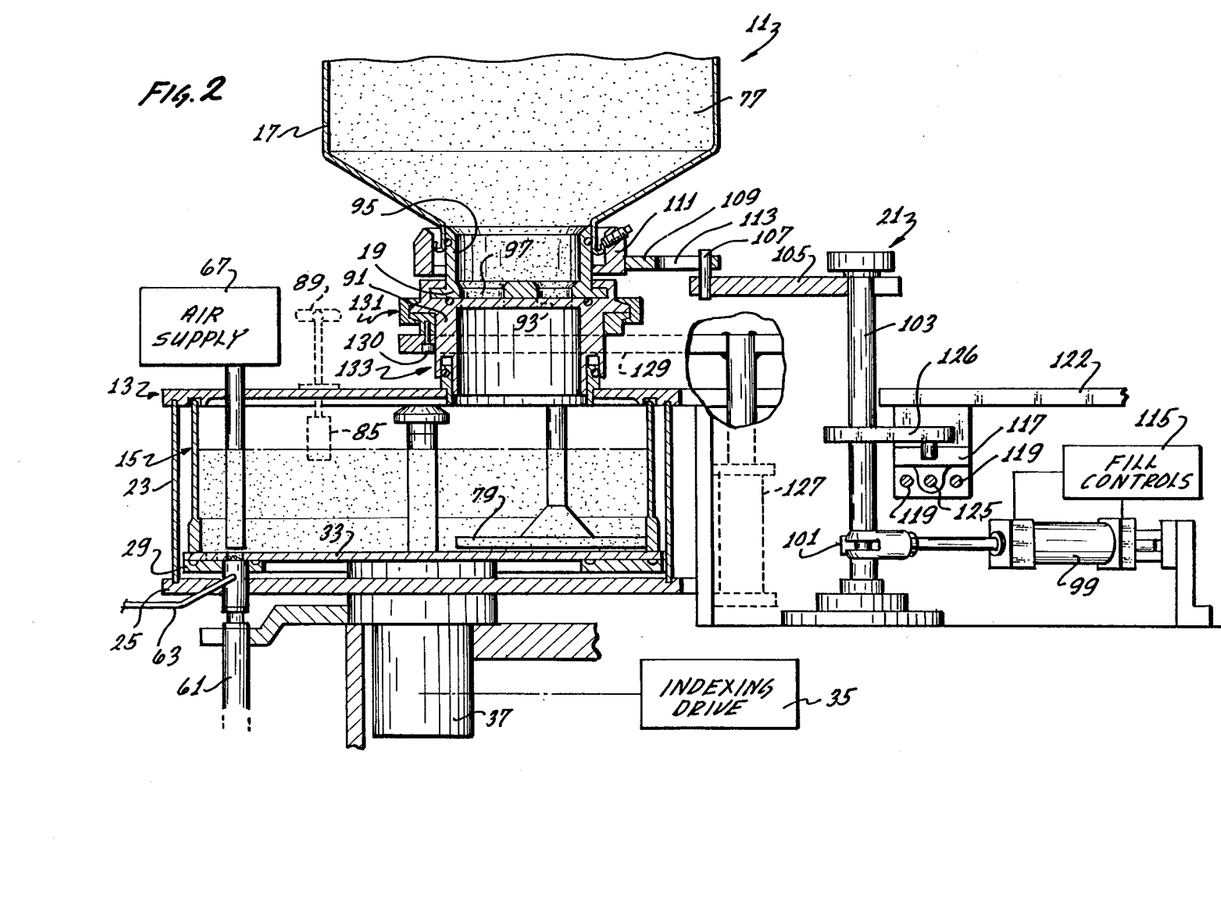
FIGS. 2 and 3 are sectional views taken generally along lines 2—2 and 3—3, respectively, of FIG. 1.
Figure 3:
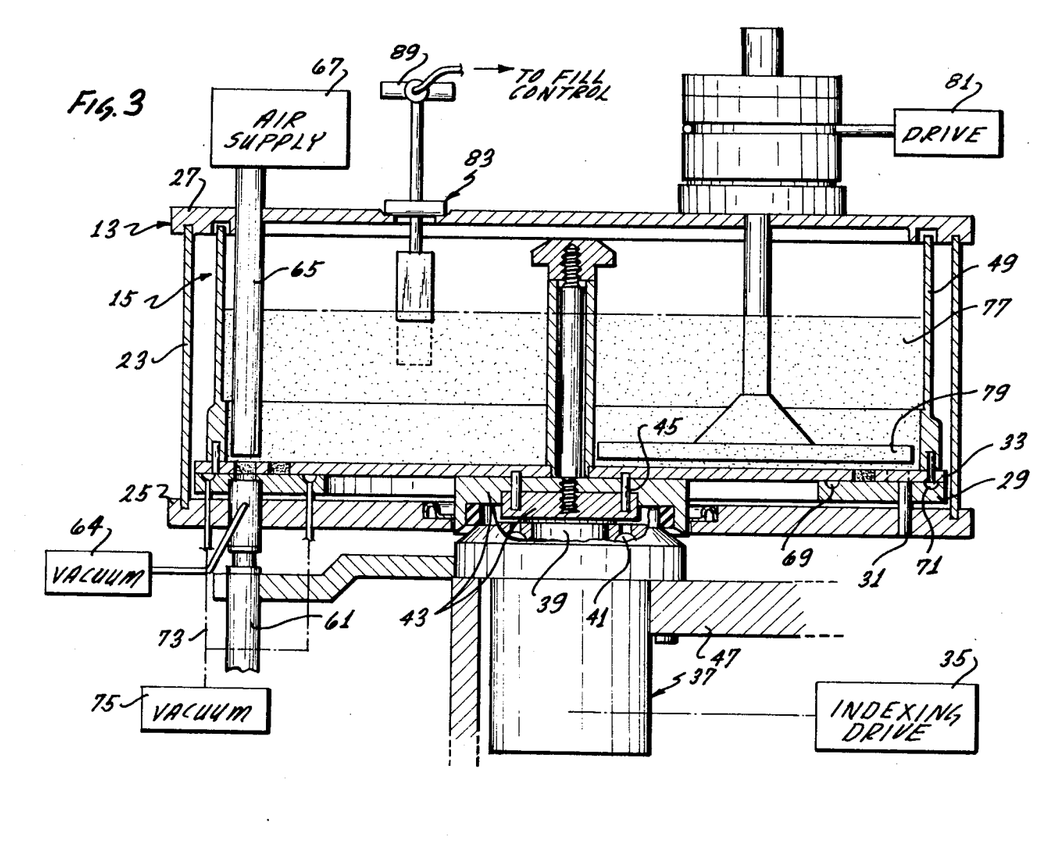

FIGS. 1-3 show an apparatus 11 which generally comprises a housing 13, a primary hopper 15, a secondary hopper 17, valve means 19 for controlling the flow of particulate material from the secondary hopper to the primary hopper and valve operating means 21. Although various different constructions are possible, the housing 13 comprises a peripheral wall 23, a base 25 suitably affixed to the lower end of the peripheral wall and a cover 27 suitably affixed to the upper end of the peripheral wall (FIG. 3).

An annular member 29 is suitably attached to the base 25 as by a plurality of fasteners 31 (only one being shown in FIG. 3) within the housing 13. A movable plate in the form of a rotatable disc or turret 33 is coupled to an indexing drive 35 through a suitable drive mechanism 37 which includes a shaft 39 (FIG. 3), a bearing 41, drive elements 43 and suitable fasteners 45. The drive mechanism 37 is appropriately supported by a supporting structure 47 and projects through an opening in the base 25 whereby it supports the turret 33 for rotational movement on, or very slightly above, the annular member 29.

To minimize the likelihood of particulate material getting between the turret 33 and the annular member 29 and to reduce friction, the confronting surfaces are lapped, coated with a hard lubricating surface and lapped again. For example, the coating may be of the type known as Magnaplate which is available from General Magnaplate Company.

Although various different constructions are possible, in this embodiment, the primary hopper 15 includes a peripheral wall 49 which is attached to the turret 33 for rotation therewith. Thus, the turret 33 may be considered as the floor of the hopper 15 or as simply a separate member that rotates with the hopper.

The turret 33 has openings 51 (FIG. 1) arranged in an outer ring and openings 53 arranged in an inner ring, with the adjacent holes of the two rings being circumferentially offset with respect to each other. Each of the openings 51 is of the same volume, and each of the openings 53 is of the same volume. In this embodiment, all of the openings 51 and 53 are identical. Each of the openings 51 and 53 is in the form of a thin cylinder, and the axial dimension of the cylinder is no greater than about the diameter of the opening, and preferably, the diameter of each of the openings is greater than the axial dimension of the opening.

Figure 5:
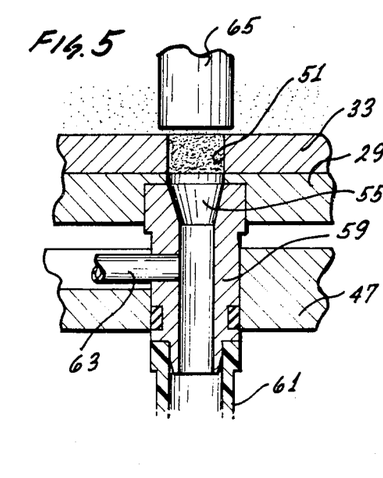
FIGS. 5 and 6 are enlarged, fragmentary sectional views illustrating the transfer of particulate material to a container at one of the filling stations.
Figure 6:
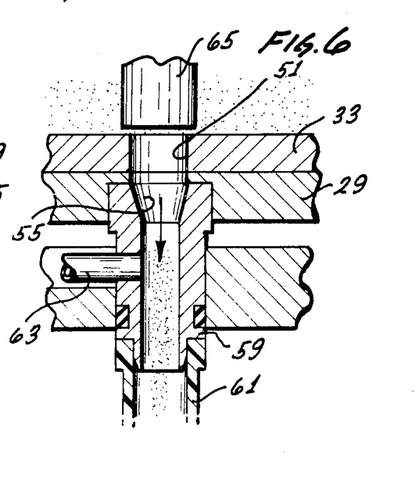

The annular member 29 has discharge ports 55 and 57 (FIG. 1) arranged at filling stations, respectively, at the correct radial locations so that the rings of holes 51 and 53 can be brought into registry with them, respectively as the turret 33 rotates. As shown in FIGS. 5 and 6, a discharge tube 59 is fixed to the annular member 29 and defines the discharge port 55. The discharge tube leads through the supporting structure 47 to a container 61 which is to receive particulate material. In this embodiment, the container 61 is in the form of an inflatable plastic bag having a non-distensible wall. A vacuum conduit 63 leads from the tube 59 to an appropriate vacuum source 64 (FIG. 3). The discharge port 57 is defined by an identical discharge tube 59 and has an identical vacuum conduit 63. Another of the containers 61 is in direct communication with the discharge tube 59 which defines the discharge port 57.

Stationary air supply tubes or nozzles 65 are mounted, for example, on the cover 27 coaxial with the discharge ports 55 and 57, respectively. Each of the nozzles 65 is coupled to a supply 67 of air under pressure and terminates in very slightly spaced relationship to the upper surface of the turret 33 as shown in FIGS. 5 and 6.

Figure 4:
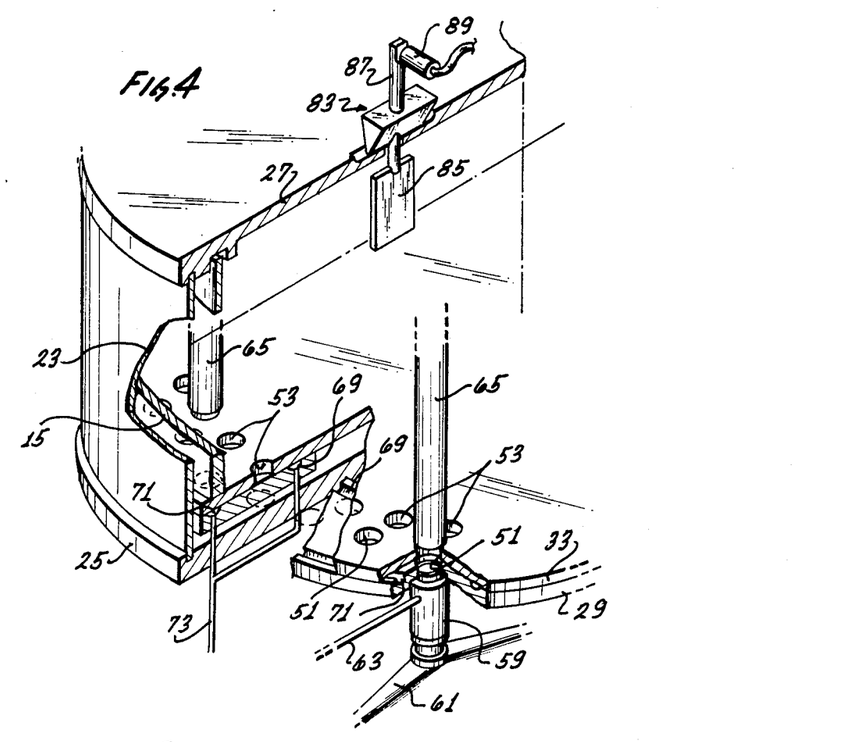
FIG. 4 is a fragmentary, isometric view partially in section illustrating the structure adjacent the two filling stations.

As shown in FIGS. 2-4, the upper surface of the annular member 29 confronts, and is closely adjacent to, the under or lower surface of the turret 33. An inner annular groove 69 and an outer concentric annular groove 71 are formed in the upper surface of the annular member 29. Both of the grooves 69 and 71 are coupled via a conduit 73 to a vacuum source 75 (FIG. 3).

Particulate material 77 is supplied from the secondary hopper 17 (FIG. 2) to the primary hopper 15 under the control of the valve means 19. A rotary agitator 79 (FIG. 3) is rotated by a suitable drive 81 to break up any clumps of the material 77 and to help assure even and complete filling of the openings 51 and 53. The agitator 79 may be of various different designs and, for example, may comprise a plurality of radially extending vanes.

A level or height sensor 83 (FIGS. 3 and 4) senses the upper level of the material 77 in the primary hopper 15. Although various different level sensors can be utilized, in the illustrated embodiment, it comprises a paddle 85 pivotally mounted by an arm 87, which is pivoted about the cover 27, and a proximity switch 89. As the level of the material 77 rises, the paddle 85 pivots to move the arm 87 away from the proximity switch to provide a stop signal when the level of the material reaches a predetermined height. As the level drops, the paddle 85 and arm 87 counterrotate toward the switch 89 to provide a start signal when the level of the material drops to a predetermined level, and the arm 87 is positioned a predetermined distance from the switch 89.

The stop and start signals operate the valve operating means 21 to close and open the valve means 19, respectively. Although the valve means 19 can take different forms, in this embodiment, it includes a valve seat 91 (FIG. 2) having a plurality of apertures 93 extending therethrough and a valve element 95 also having a plurality of apertures 97 extending therethrough. The valve element 95 and the valve seat 91 form, in effect, a floor for the secondary hopper 17. The valve element 95 can be rotated to bring the apertures 97 into registry with the apertures 93 to permit gravity flow of the material 77 from the secondary hopper 17 into the primary hopper 15. The portions of the valve seat 91 and the valve element 95 which contain the apertures 93 and 97 are in closely adjacent, confronting relationship, and the rotation of the valve element 95 provides a shearing or cutting action which acts like scissors to shear the particulate material, including any clumps of material, that may be in the apertures 93 and 97 when the valve means 19 closes.

Although the valve element 95 can be rotated in different ways, in this embodiment, the valve operating means 21 includes a pneumatic actuator 99, a link 101, a rotatable shaft 103, an arm 105 fixed to the shaft 103, a pin 107 carried by the outer end of the arm 105, and an arm 109 coupled to the valve element 95 at its inner end by a coupling 111 and having a slot 113 for receiving the pin 107. In the full line position of FIG. 1, the valve means 19 is closed in that the apertures 93 and 97 are completely out of registry. However, by retracting the actuator 99 in response to a start signal, the arm 109 is pivoted clockwise to the position shown in dashed lines in FIG. 1 to bring the apertures 97 into registry with the apertures 93 so that the material 77 can flow by gravity through the registering apertures into the primary hopper 15. In response to the stop signal, the actuator 99 is extended to the full line position of FIG. 1 to close the valve means 19. The stop and start signals from the level sensor 83 can be processed by fill controls 115 in various ways known in the art to control the actuator 99.

The maximum extent to which the apertures 93 and 97 may be placed in registry can be controlled by varying the position of an adjustable stop 117 (FIG. 1). In the illustrated embodiment, the stop 117 is mounted for movement along parallel guide rods 119 which are suitably retained on a mounting block 121 which is mounted on supporting structure 122. The position of the stop 117 along the rods 119 can be adjusted by rotating a knob 123 which turns a screw 125 which extends through the stop 117. The stop 117 limits the pivoting travel of an arm 126 fixed to the shaft 103. Specifically, a pin 128 carried by the arm 126 engages the stop 117 as shown, for example, in dashed lines in FIG. 1. Using this adjustment, the maximum opening of the valve means 19 can be adjusted.

To provide for more even feeding of the particulate material 77 from the secondary hopper 17 to the primary hopper 15, the secondary hopper can be vibrated when the valve means 19 is open. This can be accomplished, for example, by a fixedly mounted pneumatic actuator 127 (FIG. 2) via a plate 129, fastener 130 and a suitable coupling 131 for attaching the plate 129 to the valve seat 91 and the valve element 95 so that they, along with the secondary hopper 17 can be vibrated vertically relative to the primary hopper 15. A collar and slot connection 133 permit the primary hopper 15 to remain stationary during vibration of the secondary hopper 17.

In operation of the apparatus 11, containers 61 are positioned beneath the discharge tubes 59, and the agitator 79 and the turret are rotated to evenly fill the openings 51 and 53 with the particulate material 77 under the influence of gravity. The indexing drive 35 indexes the rotational movement of the turret 33 so that it sequentially brings each of the openings 51 and 53 into precise registry with the discharge ports 55 and 57, respectively, and dwells there momentarily so that blasts of air under pressure from the nozzles 65 can simultaneously transfer the particulate material at the two discharge ports into the associated container 61. This indexing motion of the turret 33 followed by blasts of air from the air supply 67 is repeated a sufficient number of times to provide the correct quantity of material 77 into each of the containers 61. Vacuum is applied through the vacuum conduit 63 following transfer of the material 77 from the openings 51 and 53 to withdraw air from the containers that has been blown into the containers from the air supply 67. The vacuum may be applied following each indexing motion of the turret 33 or following any predetermined number of indexing motions of the turret. Periodically, such as after each container 61 is filled, vacuum is applied to the conduit 73 to evacuate any of the material 77 that may have gotten between the turret 33 and the annular member 29 and migrated to the grooves 69 and 71.

To maintain substantially constant density of the particulate material 77 in the openings 51 and 53, the height of the material 77 in the primary hopper 15 is closely controlled by the level sensor 83, the valve means 19 and the valve operating means 21. In fact, close control over the weight of material 77 deposited into the container 61 can be obtained from the volume of openings 51 and 53. Fine control over the weight of materal 77 deposited into the container 61 can be obtained by varying the height of the material 77 in the primary hopper 15 to thereby vary the density of the material in the openings 51 and 53. Accuracy is enhanced by utilizing at least five, and preferably about fifteen, of each of the openings 51 and 53 to provide the desired dosage of material to the associated container 61.

Although two rings of the openings 51 and 53 have been shown, obviously any desired number of the rings of openings can be provided. The controls for the sequencing of operations for the apparatus 11 can be conventional.

Figures 7, 8:
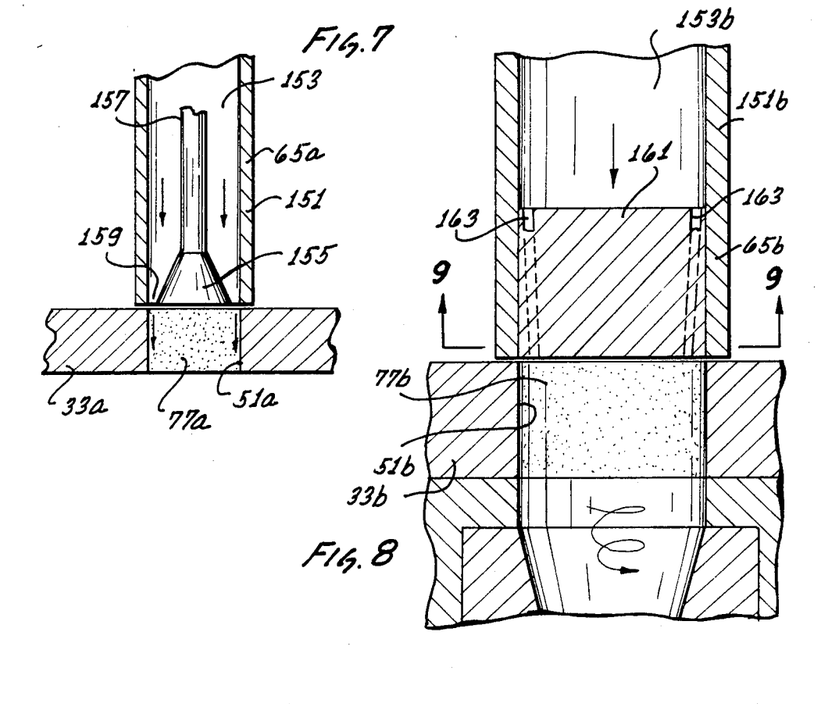
FIG. 7 is a fragmentary, sectional view similar to a portion of FIG. 5 showing one optional modification to the air supply nozzle.
FIG. 8 is a sectional view similar to FIG. 7 showing a second modification to the air supply nozzle.

FIG. 7 shows an alternate air nozzle 65a which includes a tube 151 having a central cylindrical passage 153 extending therethrough and a cone 155 coaxial with the passage 153 and suitably attached to the tube 151 as by a rod 157 and other suitable structure not shown in FIG. 7. The cone 155 preferably terminates flush with the lower end of the tube 151 to define therewith an annular orifice 159, the outer periphery of which is in registry with, and slightly within, the periphery of the opening 51a which is at the filling station.

In use of the nozzle 65a, air under pressure is transmitted from the air supply 67 (FIG. 2) through the passage 153 and the orifice 159 such that the air is ejected from the orifice 159 in a generally tubular column or pattern toward the opening 51a at the filling station. The tubular column of air just fits within the periphery of the opening 51a to, in effect, tend to sever the particulate material 77a from the opening 51a and transfer it to the container 61 (FIG. 6). The tubular column of air represents a lower volume of air than a full cylindrical column of air that would be discharged from the tube 151 if the cone 155 were not employed. Accordingly, less air is transmitted to the container 61 (FIG. 6).

Figure 9:
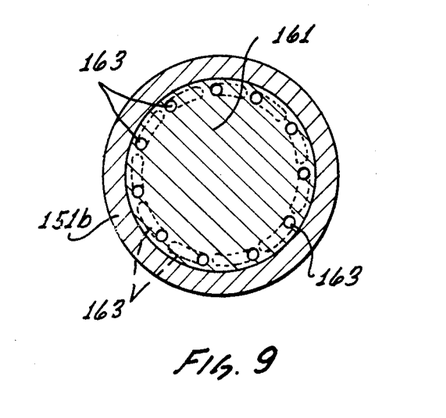
FIG. 9 is a view taken generally along line 9—9 of FIG. 8.
Figure 10:
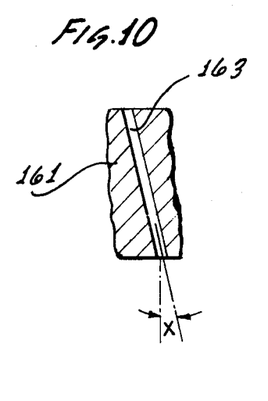
FIG. 10 is a fragmentary sectional view illustrating one of the inclined passages through the deflector.

FIGS. 8–10 show a nozzle 65b which includes a tube 151b having an axial passage 153b therethrough and a deflector 161 mounted in the lower, or discharge, end of the tube 151b. In this embodiment, the deflector 161 terminates flush with the lower end of the tube 151b and has a plurality of inclined passages 163 extending therethrough. Each of the passages 163 lies closely adjacent the periphery of the deflector 161 and extends axially and circumferentially through the deflector. As shown in FIG. 10, the angle "X" at which the passage 163 extends circumferentially should be sufficient so that air discharged from the passage 163 can impart a swirling motion to the particulate material 77b in the opening 51b.

In use, air under pressure from the passage 153b enters the inclined passages 163 and is discharged therefrom in the form of a swirling, tubular column or pattern, with the periphery of the tubular column being in registry with, or slightly within, the periphery of the opening 51b. This imparts a swirling motion to the material 77b and results in transfer of the material from the opening 51b to the container therebelow (FIG. 6) with a minimum of air. Thus, the embodiment of FIGS. 8–10 accomplishes a whirlwind-type of ejection of the material 77b from the opening 51b.

Although an exemplary embodiment of the invention has been shown and described, many changes, modifications and substitutions may be made by one having ordinary skill in the art without necessarily departing from the spirit and scope of this invention.

We claim:

1. An apparatus for loading particulate material into a container comprising:
    a hopper for containing a supply of the particulate material;
    a movable plate having a plurality of openings therethrough, said plate being positioned below the hopper so that particulate material from the hopper can fill the openings under the influence of gravity;
    means for controlling the height of the particulate material in the hopper to thereby control the density of the particulate material in the openings;
    a member below the plate for closing the lower ends of the openings in the plate, said member having a discharge port at a filling station, the container which is to receive the particulate material being at said filling station;
    means for moving the movable plate over the member to sequentially bring at least some of the openings into registry with the discharge port; and
    means for transferring the particulate material from the openings to the container when the openings are in registry with the discharge port;
    wherein the member has a surface which confronts the plate and at least one groove in said surface of the member for collecting particulate material that gets between the plate and the member and means for removing the particulate material from the groove.

2. An apparatus as defined in claim 1 wherein said removing means includes means for communicating vacuum pressure with said groove.

3. An apparatus for loading particulate material into a container comprising:
    a hopper for containing a supply of the particulate material;
    a movable plate having a plurality of openings therethrough, said plate being positioned below the hopper so that particulate material from the hopper can fill the openings under the influence of gravity;
    means for controlling the height of the particulate material in the hopper to thereby control the density of the particulate material in the openings;
    a member below the plate for closing the lower ends of the openings in the plate, said member having a discharge port at a filling station, the container which is to receive the particulate material being at said filling station;
    means for moving the movable plate over the member to sequentially bring at least some of the openings into registry with the discharge port; and
    means for transferring the particulate material from the openings to the container when the openings are in registry with the discharge port;
    wherein said transferring means includes nozzle means for directing gas in a generally tubular pattern toward the opening at the filling station.

4. An apparatus as defined in claim 3 wherein the outer periphery of the tubular pattern is within the periphery of said opening at the filling station.

5. An apparatus as defined in claim 3 wherein said nozzle means directs the gas into the opening at the filling station in a direction which has components extending axially and circumferentially of such opening whereby at least some of the particulate material is swirled as it is transferred from such opening.

6. An apparatus for loading particulate material into container comprising:
    a hopper for containing a supply of the particulate material;
    a movable plate having a plurality of openings therethrough, said plate being positioned below the hopper so that particulate material from the hopper can fill the openings under the influence of gravity;
    means for controlling the height of the particulate material in the hopper to thereby control the density of the particulate material in the openings;
    a member below the plate for closing the lower ends of the openings in the plate, said member having a discharge port at a filling station, the container which is to receive the particulate material being at said filling station;
    means for moving the movable plate over the member to sequentially bring at least some of the openings into registry with the discharge port; and
    means for transferring the particulate material from the openings to the container when the openings are in registry with the discharge port;

wherein said hopper is a first hopper and said controlling means includes a second hopper above said first hopper, valve means for controlling flow of particulate material from the second hopper to the first hopper and means responsive to the level of particulate material in the first hopper dropping below a predetermined level for opening said valve means; and wherein the member has a surface which confronts the plate and at least one groove in said surface of the member for collecting particulate material that gets between the plate and the member and means for removing the particulate material from the groove, said removing means including means for communicating vacuum pressure with said groove.

* * * * *